June 18, 1935.  I. L. FINN  2,005,459
STRAINER FOR SINKS
Filed Dec. 19, 1934
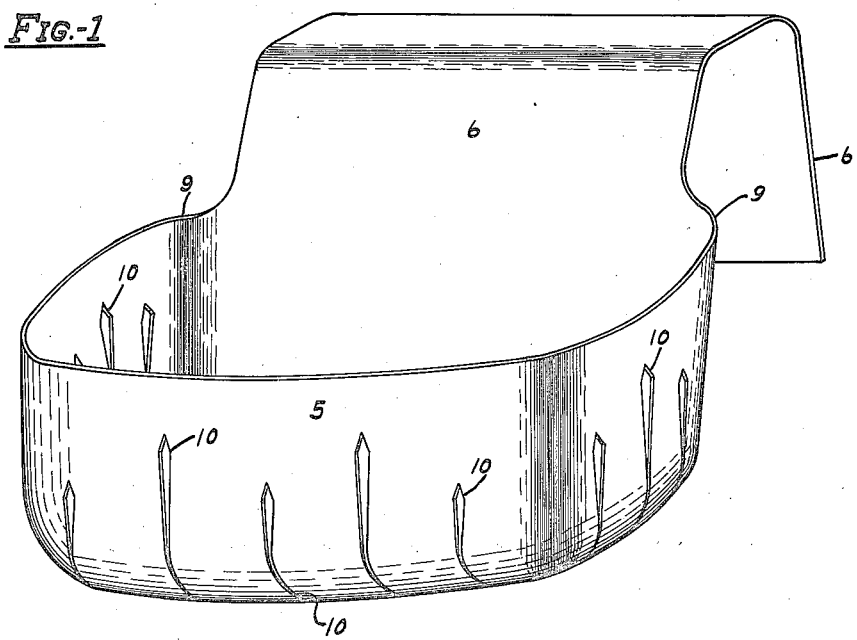
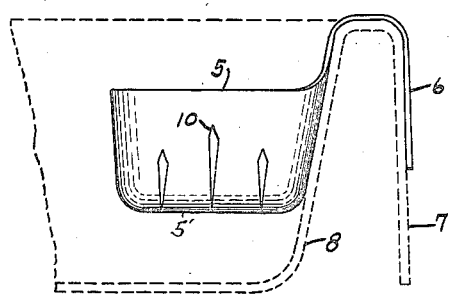
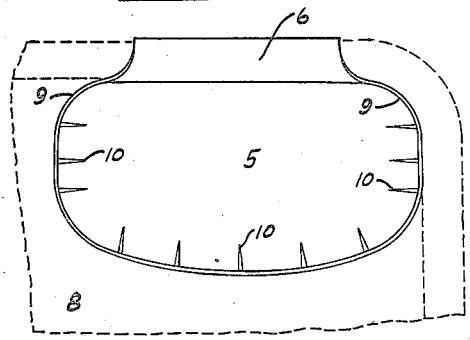
INVENTOR:
IDA L. FINN,
BY James A Walsh
ATTORNEY.

Patented June 18, 1935

2,005,459

UNITED STATES PATENT OFFICE 2,005,459

STRAINER FOR SINKS

Ida L. Finn, Racine, Wis.

Application December 19, 1934, Serial No. 758,188

4 Claims. (Cl. 4—290)

Strainers for sinks used in households commonly comprise a vessel adapted to lie upon the bottom of the sink, the bottom of the strainer being perforated, so that when refuse is placed therein and water let into the sink as frequently occurs, portions of the refuse become dissolved or flushed through the bottom, resulting in a messy condition in the sink, which is objectionable. It is my object, therefore, to provide an article of manufacture comprising a strainer with an imperforate bottom and slotted walls, which may be suspended from the rim of the sink and the contents of which will not be affected by small quantities of water drawn into the sink from time to time as is customary.

In the accompanying drawing, forming part hereof, Figure 1 is a perspective view of a strainer embodying my invention; Fig. 2, an end elevation showing the sink in dotted lines and the strainer suspended from its rim; and Fig. 3 is a plan view of the strainer.

In carrying out my invention I preferably form the strainer from a single piece of metal or any appropriate material, the bowl 5 being of oblong shape as indicated in Fig. 1, and terminating at its rear side in an integral hanger 6 adapted to snugly fit about and grip the apron 7 of the sink 8 or other form of rim, and, being formed with curved corners 9, the strainer may be hung in a corner of the sink, as well as along its walls between the corners thereof, as desired.

As indicated, the bottom 5' and rear wall are imperforate, while the front and end walls are provided with vertical slots 10, shown as somewhat exaggerated for purpose of clearness, and tapered toward the bottom.

In use my improved strainer is hung from the rim of the sink so that it will be positioned an appreciable distance from the sink bottom, and drainage therefrom may be readily flushed from beneath the strainer without water entering the bottom of the latter. Instead of employing ordinary perforations in the strainer I provide the alternately arranged short and long slots 10 so that coarse or moist material as it accumulates in the vessel will be freely drained, and by maintaining the strainer well above the sink bottom I eliminate untidy condition of the sink, and obviate the possibility of rust forming on the sink bottom, which is a common objection to the use of that type of strainer which is constantly in contact with the bottom of the sink.

I claim as my invention:

1. As an article of manufacture, a strainer comprising a bowl of substantially oblong shape having an imperforate bottom and a rear wall terminating in a curved hanger, the front and end walls of the bowl embodying vertically arranged drainage openings.

2. As an article of manufacture, a strainer composed of a single piece of material comprising a bowl of substantially oblong shape having an imperforate bottom, a rear wall terminating in a curved hanger adapted to fit about a sink rim, and front and side walls embodying means for draining the strainer.

3. As an article of manufacture, a strainer composed of a single piece of material comprising an imperforate bottom and front and end walls having curved ends to fit corners of a sink, said front and end walls having drainage openings therein terminating at approximately the juncture of the bottom and walls, and a rear wall forming part of the strainer terminating in a curved hanger for supporting the strainer above a sink bottom.

4. As an article of manufacture, a strainer of substantially oblong shape composed of a single piece of material comprising a bowl having an imperforate bottom, perforated front and end walls, and a rear wall terminating in an integral hanger and adapted to fit about a sink frame, to support the strainer above a sink bottom.

IDA L. FINN.